H. H. DOW.
MECHANICAL OR STRUCTURAL ELEMENT.
APPLICATION FILED JULY 14, 1916.

1,296,373.  Patented Mar. 4, 1919.

Witnesses:
O. M. Kappler
Mary Gladwell

Inventor
HERBERT H. DOW.
by Fay, Oberlin & Fay
Attorneys

UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

MECHANICAL OR STRUCTURAL ELEMENT.

1,296,373.      Specification of Letters Patent.      Patented Mar. 4, 1919.

Application filed July 14, 1916. Serial No. 109,216.

*To all whom it may concern:*

Be it known that I, HERBERT H. Dow, a citizen of the United States, and a resident of Midland, county of Midland, and State of Michigan, have invented a new and useful Improvement in Mechanical or Structural Elements, of which the following is a specification, the principle of the invention being herein explained and the best mode in which I have contemplated applying that principle, so as to distinguish it from other inventions.

There are many instances, in machine or other structures, where the lightness of an element or member is a matter of considerable importance, providing it can be achieved while still retaining sufficient strength. Thus spars for yachts, ribs for aeroplane wings, and pitmen or connecting rods for high-speed engines and the like, are illustrative instances of the sort in mind. The object of the present improvement is to provide an element extremely light for use in connections such as those indicated, which will combine the necessary tensile strength with sufficient rigidity to enable the member to withstand the compression strains to which it will be subjected as well. To the accomplishment of these and related ends, the invention consists specifically of a shell of high-grade steel which will be relatively light compared with the weight of a solid member of the same material, but which will nevertheless be strong enough to withstand the tensile strains to which the member may be properly subjected. This shell is then filled with molten magnesium which, upon solidifying, provides for the compression strains.

The annexed drawing and the following description set forth in detail certain mechanism embodying the invention, such disclosed means constituting, however, but one of various mechanical forms in which the principle of the invention may be used.

In said annexed drawing:—

Figure 1:
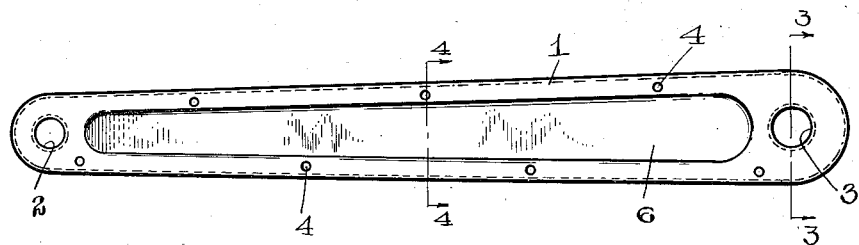
Figure 2:
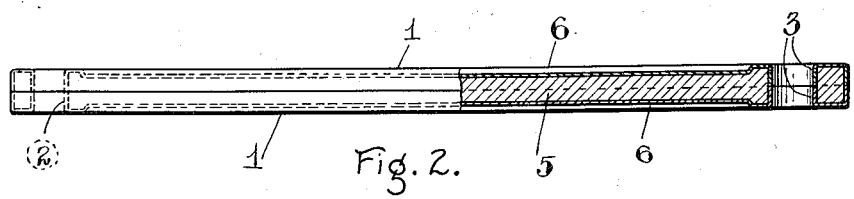
Figure 3:
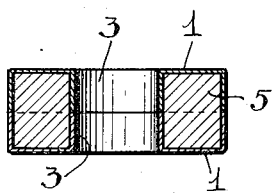
Figure 4:
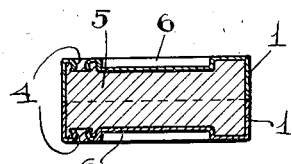

Figure 1 is a side elevational view of a mechanical element, specifically a pitman or connecting rod, constructed in accordance with my present invention; Fig. 2 is a longitudinal central section thereof; and Figs. 3 and 4 are transverse sections thereof taken on planes indicated by the lines 3—3 and 4—4, respectively, in Fig. 1.

Referring to the particular structure illustrated in the aforesaid drawing, the steel shell will be seen to be composed of two parts 1, 1, preferably made up in the form of stampings, and each conveniently representing half of the complete article. Such shell sections 1, 1 are provided at their respective ends with complementary tubular bosses 2, 2 and 3, 3, which, when the parts are fitted together, form transverse holes for the reception of suitable bearing sleeves or bushings (not shown), as will be readily understood. Each of the shell sections, furthermore, is provided with a plurality of undercut projections 4, on its inner face, these likewise being conveniently stamped up from the material of which the sections are composed, as indicated in Fig. 4.

With the sections held together in any suitable way, molten magnesium is then poured into the hollow space between the same until such space is entirely filled, a suitable sprue opening (not shown) being provided where most convenient in the one section or the other, or on the line of junction between the two. The magnesium as soon as it cools forms a solid core 5, which will obviously interengage with the undercut projections on the inner faces of the sections, and so serve to tie the latter together. If added security, however, in this respect is desired, transverse bolts (not shown) may be utilized.

Owing to the fact that metallic magnesium, upon cooling, tends slightly to contract in bulk, and so would be left, in a degree, under tension, in order to complete the article I deform the shell by placing the article, after the core has thus cooled, in a suitable press, and press in portions of the sides of the sections, as at 6, 6, so as to reduce the contained volume and thereby take up any left over space. The magnesium being quite malleable will flow, or give way, to accommodate itself to the restricted interior of the shell, and the resultant structure will have the aspect of an article fashioned out of homogeneous material. In view of the lightness of the steel shell which will suffice for the tensile requirements, and the fact that the core of magnesium has a very low specific gravity (1.70), it will be seen that a remarkably light article is produced. Of course, the magnesium core will take up some tensile strains and conversely the steel shell will take up some compression strains, when prevented from buckling by the presence of such core. In other words the two mutually reinforce each other. This results more especially from the deformation of the cross-section of the shell, whereby the contained space is decreased and all internal strains relieved, much the same as by the annealing of a metal article of uniform composition.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. As a new article of manufacture, a structural or mechanical element consisting of a shell of steel, and a core of lighter malleable metal, substantially as described.

2. As a new article of manufacture, a structural or mechanical element consisting of a shell of steel, and a core of lighter metal cast therein, the walls of said shell being thereupon compressed, substantially as described.

3. As a new article of manufacture, a structural or mechanical element consisting of a shell of steel, and a core of lighter metal cast therein, the walls of said shell being thereupon compressed from opposite sides so as to reduce the contained space in said shell.

4. As a new article of manufacture, a structural or mechanical element consisting of a shell of steel, and a core of magnesium.

5. As a new article of manufacture, a structural or mechanical element consisting of a shell of steel, and a core of magnesium, the walls of said shell being thereupon compressed to reduce the contained space in said shell.

6. As a new article of manufacture, a structural or mechanical element consisting of a shell of steel strong enough to withstand tensile strains, and a core of magnesium cast in said shell to render the same capable of withstanding compression strains, the walls of said shell being deformed after said core has cooled, so as to reduce the contained space in said shell.

7. As a new article of manufacture, a structural or mechanical element consisting of a shell made of plural parts, and a core of lighter metal, the latter inter-engaging with the parts of said shell to hold the same together.

8. As a new article of manufacture, a structural or mechanical element consisting of a shell made of plural parts, and a core of lighter metal cast in said shell and inter-engaging with the parts thereof to hold the same together.

9. As a new article of manufacture, a structural or mechanical element consisting of a shell made of plural parts, and a core of lighter metal cast in said shell and inter-engaging with the parts thereof to hold the same together, said shell being thereupon deformed so as to reduce the contained space in said shell.

10. As a new article of manufacture, a structural or mechanical element consisting of a shell made of plural parts having undercut projections on their respective inner faces, and a core of magnesium cast in said shell and engaging with such projections so as to hold said shell-parts together.

11. As a new article of manufacture, a structural or mechanical element consisting of a shell made of plural parts having undercut projections on their respective inner faces, and a core of magnesium cast in said shell and engaging with such projections so as to hold said shell-parts together, said shell being deformed after said core has cooled, so as to reduce the contained space in said shell.

Signed by me this 6th day of July, 1916.

HERBERT H. DOW.

Attested by—
A. N. Patriarche,
Jno. F. Oberlin.